(12) United States Patent
Murata et al.

(10) Patent No.: US 6,652,451 B2
(45) Date of Patent: Nov. 25, 2003

(54) ENDOSCOPE APPARATUS FOR EFFICIENTLY REMOTE-CONTROLLING A PLURALITY OF FUNCTION UNITS

(75) Inventors: Masanao Murata, Higashiyamato (JP); Toshiro Ishimura, Hachioji (JP); Mitsunobu Ono, Tokyo (JP); Mitsuo Obata, Hachioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 123 days.

(21) Appl. No.: 09/824,424

(22) Filed: Apr. 2, 2001

(65) Prior Publication Data

US 2001/0051762 A1 Dec. 13, 2001

(30) Foreign Application Priority Data

Apr. 3, 2000 (JP) ........................................ 2000-101123
Mar. 7, 2001 (JP) ........................................ 2001-063704

(51) Int. Cl.$^7$ ................................................. A61B 1/04
(52) U.S. Cl. ........................ 600/118; 600/109; 600/146; 348/65
(58) Field of Search ................................ 600/103, 109, 600/118, 146, 160; 348/65, 71–74

(56) References Cited

U.S. PATENT DOCUMENTS

| 4,941,456 A | | 7/1990 | Wood et al. |
| 5,159,446 A | * | 10/1992 | Hibino et al. ................. 348/65 |
| 5,678,568 A | * | 10/1997 | Uchikubo et al. .......... 128/897 |

* cited by examiner

*Primary Examiner*—John Mulcahy
(74) *Attorney, Agent, or Firm*—Scully, Scott, Murphy & Presser

(57) ABSTRACT

An endoscope system comprises an endoscope for industrial use, a remote control unit, a light source unit, a CCU, a motor-driven angling unit, a drum rotation variable resistor, a power supply unit, a buzzer, and a microphone. These apparatuses constituting a basic system are controlled by a system control CPU incorporated in a control unit. The system control CPU in the control unit is connected to an angle control CPU in the motor-driven angling unit and a DSP control CPU in the CCU over signal lines. Moreover, the system control CPU is connected to a remote control CPU in the remote control unit through a connector over a signal line. Consequently, the complex functions of the apparatuses are controlled in a centralized manner. This results in improved ease of use.

14 Claims, 15 Drawing Sheets

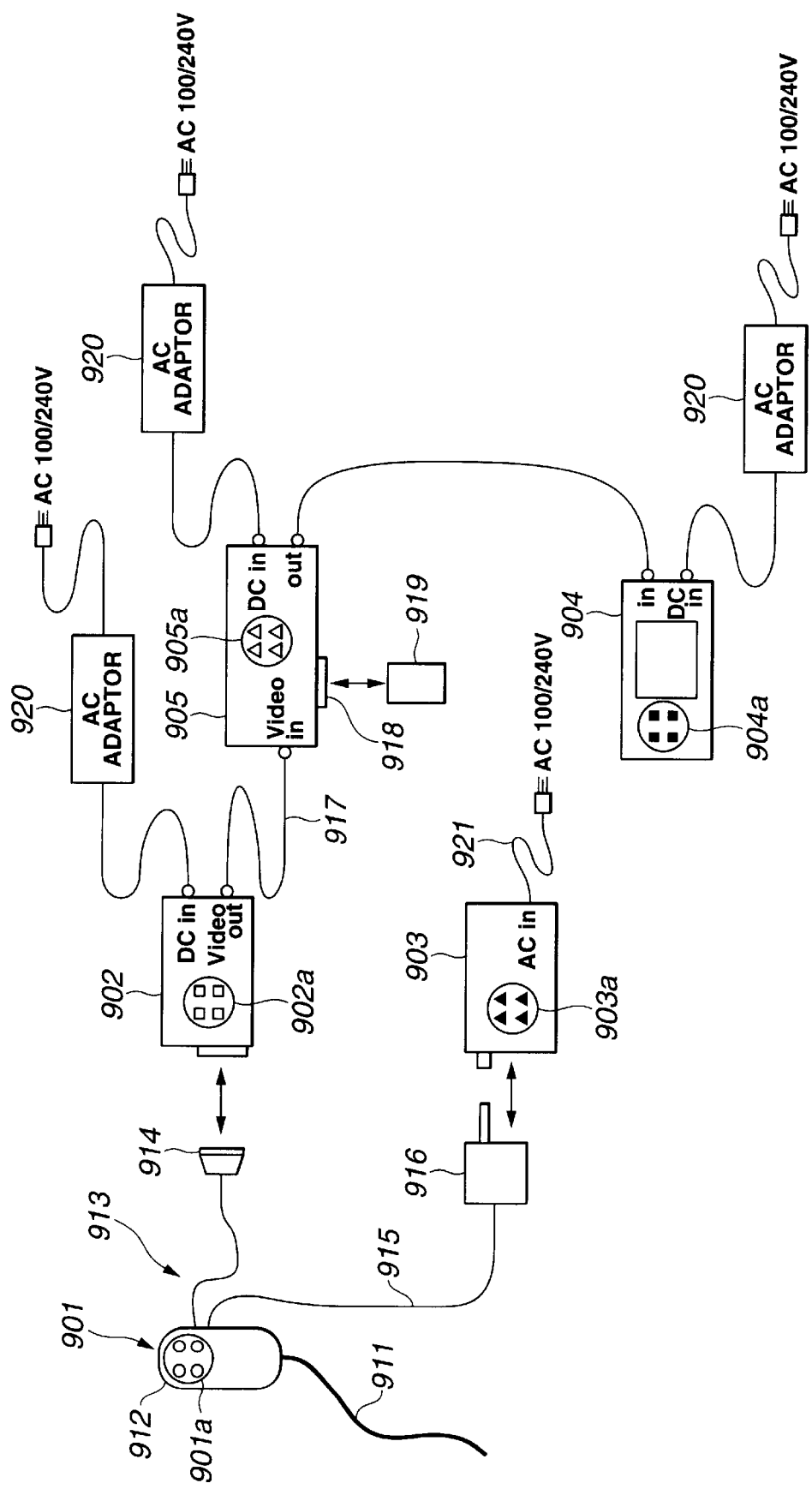

ENDOSCOPE APPARATUS FOR EFFICIENTLY REMOTE-CONTROLLING A PLURALITY OF FUNCTION UNITS

This application claims benefit of Japanese Application No. 2001-63704 filed in Japan on Mar. 7, 2001, and Japanese Application No. 2000-101123 filed in Japan on Apr. 3, 2000, the contents of which are incorporated by this reference.

BACKGROUND OF THE INVENTION

1. Field of the Invention

The present invention relates to an endoscope system, or more particularly, to an endoscope system characterized by a control unit that controls a plurality of apparatuses having different functions.

2. Description of the Related Art

In recent years, endoscope systems including an electronic endoscope that has an imaging device incorporated in a tip part of an insertion member thereof which is inserted into a lumen for the purpose of imaging a region to be observed have been widely used for medical or industrial.

This type of conventional endoscope system comprises, as shown in FIG. 19, an electronic endoscope 901, a camera control unit (CCU) 902, a light source apparatus 903, an image recording apparatus 905, and a display device 904. The electronic endoscope 901 images a region to be observed within a lumen. The CCU 902 processes an image signal from the electronic endoscope 901. The light source apparatus 903 supplies illumination light to the electronic endoscope 901. The image recording apparatus 905 records a video signal from the CCU 902. An endoscopic image is displayed on the display device 904 via the image recording apparatus 905 according to the video signal produced by the CCU 902.

The electronic endoscope 901 comprises an insertion member 911, an operator unit 912, and a universal cable 913. The insertion member 911 is inserted into a lumen. The operator unit 912 communicates with the proximal end of the insertion member 911. The universal cable 913 extends from the operator unit 912. An endoscope connector 914 attached to the universal cable 913 is joined to the CCU 902. A light guide connector 916 attached to a light guide 915 contained in the universal cable 913 is joined to the light source apparatus 903.

A video signal generated by the CCU 902 is outputted to the image recording apparatus 905 over a video cable 917. The image recording apparatus 905 receives the video signal from the CCU 902, and records an image on a memory card 919 that is attachable/detachable to a card connector 918 formed on the image recording apparatus 905.

The video signal from the image recording apparatus 905 is outputted to the display device 904. An endoscopic view image is then displayed on the display device 904.

Herein, AC adaptors 920 are power supply units for supplying power to the CCU 902, image recording apparatus 905, and display device 904 respectively.

Moreover, the electronic endoscope 901, CCU 902, light source apparatus 903, display device 904, and image recording apparatus 905 are operated mutually independently using their operation switches 901a, 902a, 903a, 904a, and 905a respectively.

However, these apparatuses (electronic endoscope 901, CCU 902, light source apparatus 903, display device 904, and image recording apparatus 905) are stand-alone apparatuses. The apparatuses must be connected to one another using video cables, and need to be used in combination with power supply equipment (AC adaptors 920 and AC power cables 921).

The apparatuses are operated independently of one another using the operation switches 901a, 902a, 903a, 904a, and 905a set to the apparatuses. Namely, the operation switch 901a is used to operate the electronic endoscope 901. The operation switch 902a is used to operate the CCU 902. The operation switch 903a is used to operate the light source apparatus 903. The operation switch 904a is used to operate the display device 904. The operation switch 905a Conventionally, the electronic endoscope 901, CCU 902, light source apparatus 903, display device 904, and image recording apparatus 905 included in the endoscope system are connected to one another while being installed independently of one another. Therefore, the connections of the apparatuses become complex, and the stand-alone apparatuses cannot be controlled in a centralized manner. Consequently, the endoscope system is hard to use, large in size, and heavy.

SUMMARY OF THE INVENTION

An object of the present invention is to provide an electronic endoscope system into which the complex functions of apparatuses are controlled in a centralized manner in order to offer improved ease of use.

Another object is to provide an electronic endoscope system that can be readily expanded to have another function which can be operated easily.

An electronic endoscope system of the present invention comprises an endoscope including an elongated insertion member, a light guide that is passed through the insertion member, an imaging device incorporated in a tip part that communicates with the insertion member, and a pair of angulation wires that is passed through the insertion member and coupled to the tip part in order to angle the tip part; a lamp located at a position supplying illumination light over the light guide; a camera control unit including a video signal processor that processes an image signal sent from the imaging device, and a first controller that controls the operation of the video signal processor; an angulation wire control unit including a motor that drives the pair of angulation wires and a second controller that controls the motor; a remote control unit including a plurality of operation switches that is used to operate the camera control unit and the angulation wire control unit, and a remote controller that outputs communication data responsively to a manipulation performed on any of the plurality of operation switches; and a system control unit including a connector through which the remote control unit is connected, and a system controller that transmits communication data, which is used to extend control, to the first controller or the second controller according to communication data received from the remote control unit through the connector.

The above and other objects, features and advantages of the invention will become more apparent from the following description when taken in conjunction with the accompanying drawings.

BRIEF DESCRIPTION OF THE DRAWINGS

FIG. 1 shows the appearance of an endoscope system;

FIG. 2 is a block diagram showing the circuitry of the endoscope system;

FIG. 3 is a block diagram showing the internal configuration of a system control CPU 24 shown in FIG. 2;

FIG. 4 is an explanatory diagram for explaining a protocol that defines communications over signal lines shown in FIG. 2;

FIG. 5 shows a variant of the endoscope system shown in FIG. 1;

FIG. 6 shows the appearance of an endoscope system;

FIG. 7 is a block diagram showing the circuitry of the endoscope system shown in FIG. 6;

FIG. 8 is a block diagram showing the circuitry of a first variant of the endoscope shown in FIG. 6;

FIG. 9 shows the appearance of a second variant of the endoscope system shown in FIG. 6;

FIG. 10 is a block diagram showing the circuitry of the endoscope system shown in FIG. 9;

FIG. 11 is a block diagram showing the circuitry of an endoscope system;

FIG. 12 shows the appearance of a variant of the endoscope system shown in FIG. 11;

FIG. 13 is a block diagram showing the circuitry of an endoscope system shown in FIG. 12;

FIG. 14 is a first explanatory diagram concerning a CCD driving method;

FIG. 15 is a second explanatory diagram concerning a CCD driving method;

FIG. 16 is a third explanatory diagram concerning a CCD driving method;

FIG. 17 is a fourth explanatory diagram concerning a CCD driving method;

FIG. 18 is a fifth explanatory diagram concerning a CCD driving method; and

FIG. 19 shows the configuration of an endoscope system concerned with a related art.

DESCRIPTION OF THE PREFERRED EMBODIMENTS

Embodiments of the present invention will be described with reference to the drawings below.

First Embodiment (Constituent Features)

Figure 1:
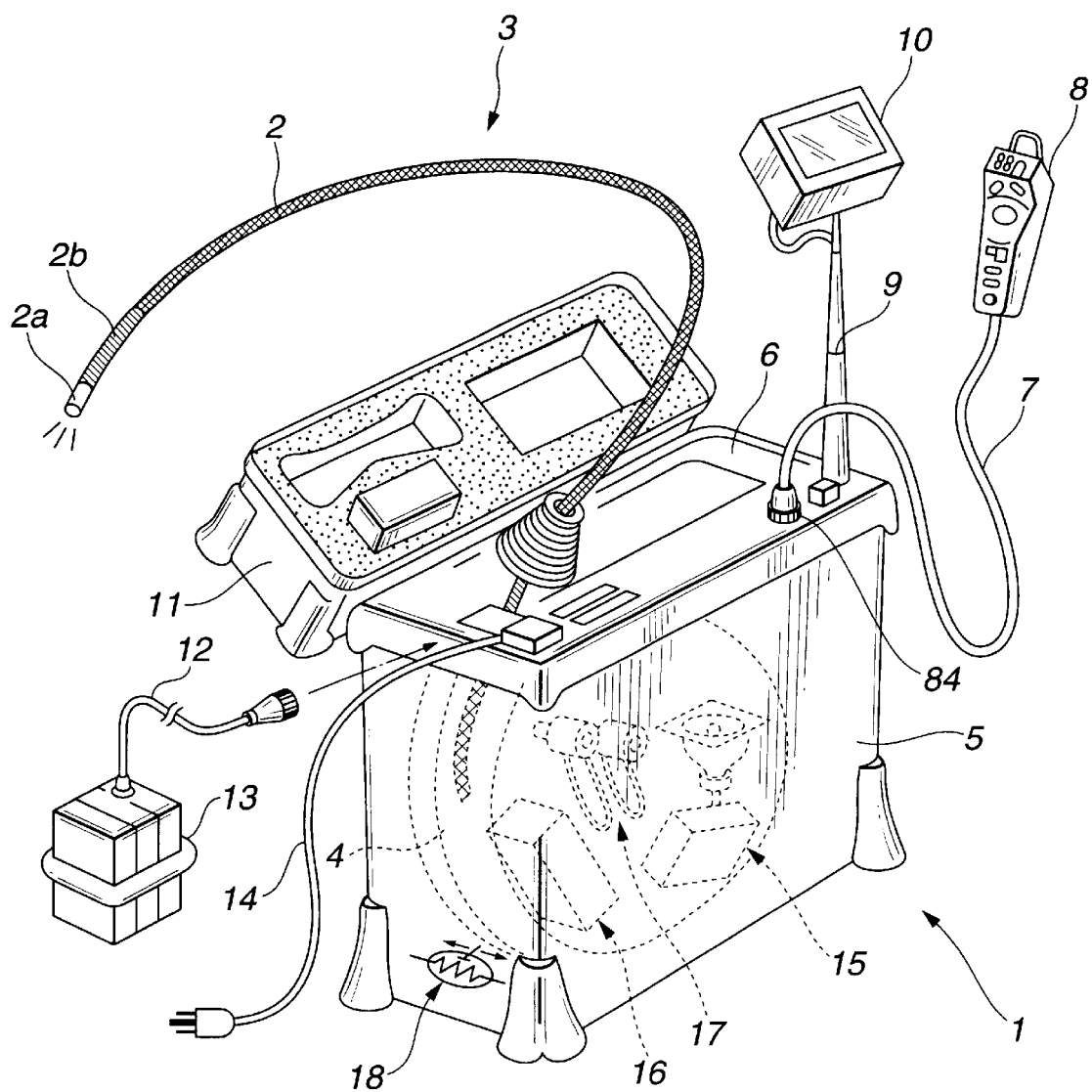
FIG. 1 to FIG. 5 are concerned with a first embodiment of the present invention.

As shown in FIG. 1, a drum-inclusive endoscope system 1 for industrial use in accordance with a first embodiment of the present invention consists mainly of an endoscope 3 for industrial use, a cylindrical drum 4, a box-like main unit 5, a front panel 6, a remote control unit 8, a display device 10, a stowage lid 11, and a battery 13. The industrial endoscope 3 has an elongated insertion member 2 that is flexible. The cylindrical drum 4 has the elongated insertion member 2 wound about the periphery thereof. The box-like main unit 5 holds the drum 4 so that the drum 4 can rotate freely. The front panel 6 is placed on the top of the main unit 5 and has connectors and others formed thereon. The remove controller unit 8 is connected to the main unit via the front panel 6 over a cable 7. The display device 10 is, for example, a liquid crystal monitor and held at the tip end of a stretchable and contractile monopode or column 9 so that the display device 10 can be swiveled freely. The stowage lid 11 has shock absorbing members for suppressing shocks imposed on stowed equipment. The battery 13 applies direct voltage over a DC cable 12. Mains voltage is applied over an AC cable 14 plugged in to the front panel 6.

Moreover, a light source unit 15, a camera control unit (CCU) 16, a motor-driven angling unit 17, and a drum rotation variable resistor 18 are stowed in the drum 4. The light source unit 15 supplies illumination light over a light guide that serves as an illumination light propagating means incorporated in the industrial endoscope 3. The CCU 16 processes a signal produced by an imaging unit that is incorporated in a tip rigid part 2a of the insertion member 2 of the industrial endoscope 3. The motor-driven angling unit 17 drives and bends a bending section 2b of the insertion member 2. The drum rotation variable resistor 18 is used to sense the number of rotations of the drum 4.

Figure 2:
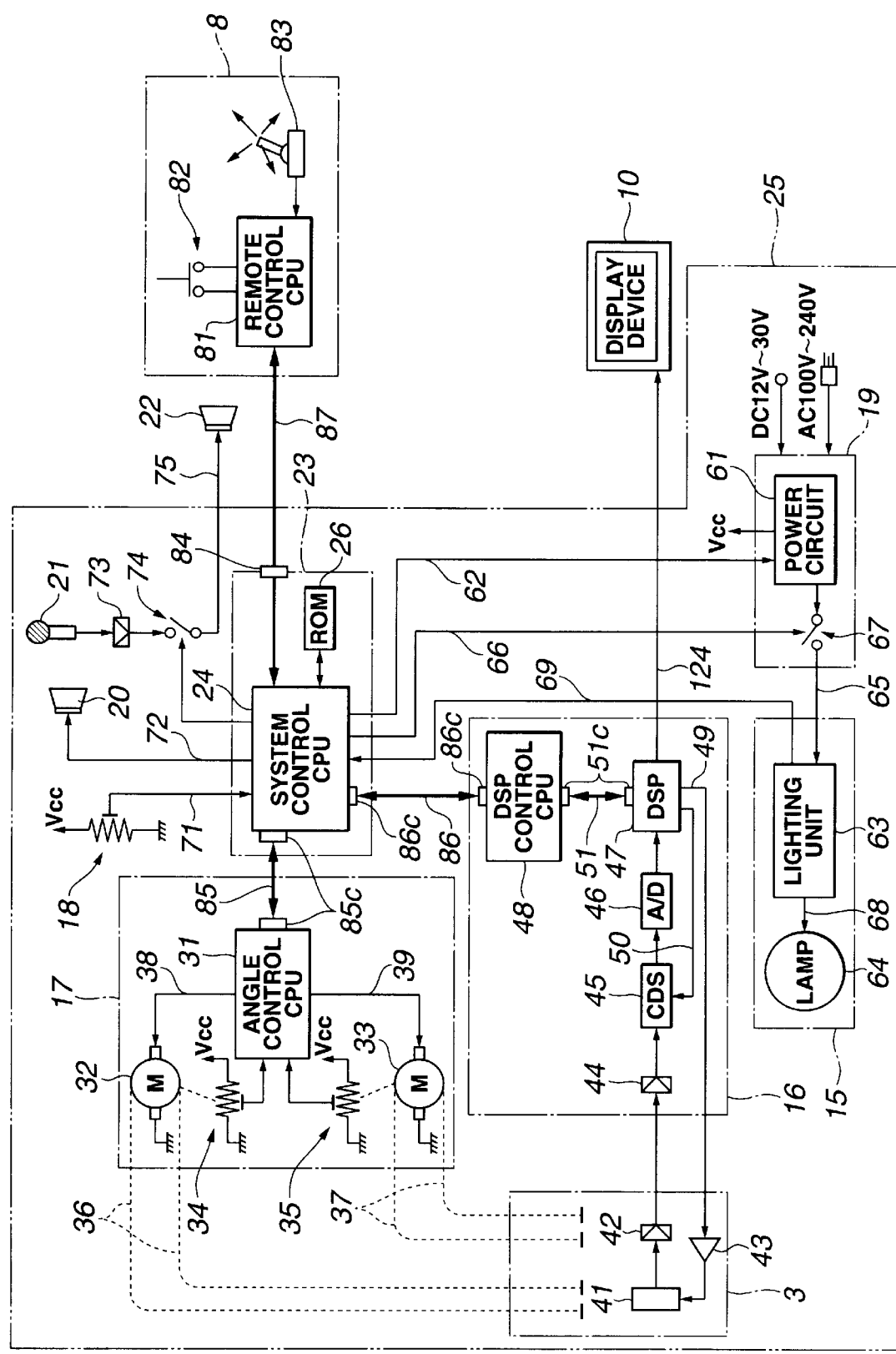

As shown in FIG. 2, the endoscope system 1 in accordance with the present embodiment includes, in addition to the industrial endoscope 3, remote control unit 8, light source unit 15, CCU 16, motor-driven angling unit 17, and drum rotation variable resistor 18, a power supply unit 19, a buzzer 20, and a microphone 21. The power supply unit 19 receives direct voltage, which ranges from 12 V to 30 V, from the battery 13, and receives alternating voltage, which ranges from 100 V to 240 V, from the mains over the AC cable 14. The power supply unit 19 thus drives the light source unit 15, and generates voltage Vcc to be applied to the apparatuses constituting the endoscope system. The buzzer 20 sounds a warning. The microphone 21 receives voice. These apparatuses and others constitute a basic system 25 that is controlled by a system control CPU 24 incorporated in a control unit 23.

A ROM 26 is a memory in which a program that describes a sequence of instructions determining the function of the system control CPU 24 responsible for control is stored. Voice received by the microphone 21 is made louder using a loudspeaker 22.

The motor-driven angling unit 17 consists mainly of an angle control CPU 31, an up/down motor 32, a left/right motor 33, an up/down potentiometer 34, a left/right potentiometer 35, up/down angulation wires 36, and left/right angulation wires 37. The angle control CPU 31 controls the motor-driven angling unit 17. The up/down motor 32 is used to bend the bending section 2b vertically. The left/right motor 33 is used to bend the bending section 2b laterally. The up/down potentiometer 34 detects an angle of vertical bending initiated by the up/down motor 32, and communicates the angle of vertical bending to the angle control CPU 31. The left/right potentiometer 35 detects an angle of lateral bending initiated by the left/right motor 33, and communicates the angle of lateral bending to the angle control CPU 31. The up/down angulation wires 36 are coupled to a tip bending piece incorporated in the bending section 2b, and used to convey driving force exerted by the up/down motor 32 and to thus bend the bending section 2b vertically. The left/right angulation wires 37 are coupled to the tip bending piece incorporated in the bending section 2b, and used to convey driving force exerted by the left/right motor 33 and to thus bend the bending section 2b laterally.

In response to a control command issued from the system control CPU 24, the angle control CPU 31 drives and controls the up/down motor 32 according to a motor driving (up/down) signal 38, and also drives and controls the left/right motor 33 according to a motor driving (left/right) signal 39.

When the up/down motor 32 rotates, the up/down angulation wires 36 are tensed, and a vertical rotation variable resistor serving as the up/down potentiometer 34 is displaced. The angle control CPU 31 detects a resistance offered by the vertical rotation variable resistor of the up/down potentiometer 34 so as to sense an angle of vertical bending.

Likewise, when the left/right motor 33 rotates, the left/right angulation wires 37 are tensed, and a lateral rotation variable resistor serving as the left/right potentiometer 35 is displaced. The angle control CPU 31 detects a resistance offered by the lateral rotation variable resistor of the left/right potentiometer 35 so as to sense an angle of lateral bending.

The imaging unit incorporated in the tip rigid part 2a of the insertion member 2 of the industrial endoscope 3 consists mainly of a charge-coupled device (CCD) 41 that is a solid-state imaging device, an amplifier 42, and a buffer 43.

The CCU 16 consists mainly of an amplifier 44, a correlative double sampler (CDS) 45, an A/D converter 46, a digital signal processor (DSP) 47, and a DSP control CPU 48. The amplifier 44 further amplifies a CCD output amplified by the amplifier 42. The CDS 45 performs correlative double sampling on an output of the amplifier 44. The A/D converter 46 converts an output of the CDS 45 into a digital form. The DSP 47 performs known video signal processing such as white balance control, tone control, and contour enhancement on a digital image signal sent from the A/D converter 46, and transfers a produced video signal to the display device 10. The DSP control CPU 48 controls the DSP 47.

The DSP 47 produces CCD driving pulses 49. The CCD driving pulses 49 are regenerated to have the original waveform restored by means of a buffer 43 incorporated in the industrial endoscope 3, and transferred to the CCD 41. Consequently, the CCD 41 is driven. At this time, a timing signal 50 synchronous with the CCD driving pulses 49 is sent to the CDS 45. The CDS 45 performs correlative double sampling according to the timing signal 50.

In the CCU 16, the DSP control CPU 48 receives control information sent from the system control CPU 24, and transfers the control information to the DSP 47 over an internal bus 51. The internal bus 51 has detachable connectors 51c attached to the ends thereof. The connectors 51c are joined to the DSP control CPU 48 and DSP 47 respectively. A video signal 52 that is an output of the DSP 47 is sent to an LCD panel of the display device 10. Consequently, a view image is displayed.

When the AC power supply or DC power supply (battery 13) (see FIG. 1) is connected to the power supply unit 19, a power circuit 61 applies various voltages Vcc to the apparatuses constituting the basic system 25. The power supply unit 19 is turned on or off in response to a power on signal 62 sent from the system control CPU 24.

The power circuit 61 applies a lighting voltage 65, with which the lamp 64 included in a lighting unit 63 within the light source unit 15 is lit. The lighting voltage 65 is controlled with a switch 67 that is opened or closed based on a lamp on/off signal 66. The lighting unit 63 included in the light source unit 15 receives the lighting voltage 65 and generates lamp driving pulses 68 with which the lamp 64 is lit. When the lighting unit 63 fails because the lamp is turned off or when the lamp is put out, a lamp sensing signal 69 is transmitted to the system control CPU 24 in order to communicate the abnormality of the lamp 64.

The drum rotation variable resistor 18 offers a function of sensing the number of rotations of the drum 4 about which the insertion member 2 of the industrial endoscope 3 is wound. The drum rotation variable resistor 18 transmits a position-of-rotated drum signal 71 to the system control CPU 24, thus informing the system control CPU 24 of the rotated state of the drum, that is, how long the insertion member 2 is drawn out.

Moreover, the system CPU 24 sends a buzzer signal 72 to the buzzer 20 in order to trigger operation sound or warning sound. Consequently, the buzzer 20 generates sound according to how the basic system 25 is operated or acts.

Furthermore, an output of the microphone 21 is amplified by the amplifier 73, and transferred to the switch 74. The switch 74 is controlled by the system CPU 24. When the switch 74 is open, the microphone 21 is muted in response to a muting signal sent from the system CPU 24. When the switch 74 is closed, an output signal of the amplifier 73 is transmitted to the loudspeaker 22 as an audio signal 75.

The remote control unit 8 has a remote control CPU 81 incorporated therein. A plurality of control mode selection switches 82 and an angling lever 83 are connected to the remote control CPU 81. Control information used to control the motor-driven angling unit 17 is transmitted to the remote control CPU 81 responsively to a manipulation performed on the angling lever 83.

The remote control CPU 81 transmits information produced responsively to a manipulation performed on the angling lever 83, or control information produced responsively to a manipulation performed on any of the switches 82 to the system control CPU 24 through a connector 84 (see FIG. 1) formed on the front panel 6.

The system control CPU 24 in the control unit 23 is connected to the angle control CPU 31 in the motor-driven angling unit 17 and to the DSP control CPU 48 in the CCU 16 over signal lines 85 and 86 respectively. The signal line 85 has detachable connectors 85c attached to the ends thereof, and the connectors 85c are joined to the system control CPU 24 and the DSP control CPU 48 respectively. The signal line 86 has detachable connectors 86c attached to the ends thereof, and the connectors 86c are joined to the system control CPU 24 and angle control CPU 31 respectively. Moreover, the system control CPU 24 is connected to the remote control CPU 81 incorporated in the remote control unit 8 over a signal line 87 through the connector 84.

Figure 3:
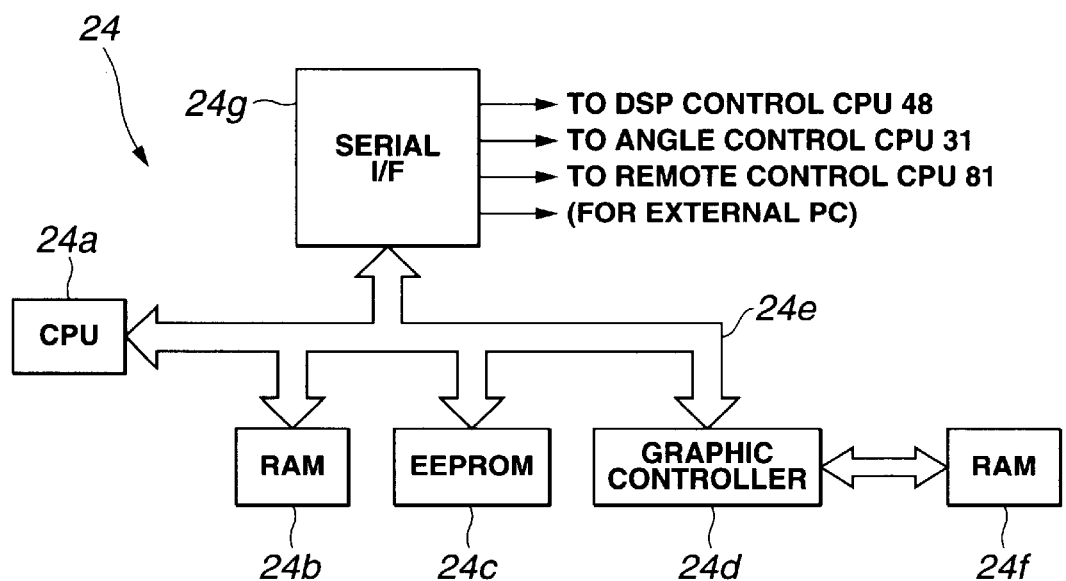

As shown in FIG. 3, a CPU microcomputer 24a, a RAM 24b, an EEPROM 24c, and a graphic controller 24d are incorporated in the system control CPU 24. The CPU microcomputer 24a serves as the core of the system control CPU 24. The RAM 24b serves as a cache memory to be used by the CPU microcomputer 24a. Programs describing sequences of instructions to be followed by the CPU microcomputer 24a are stored in the EEPROM 24c. The graphic controller 24d produces graphic data. The CPU microcomputer 24a, RAM 24b, EEPROM 24c, and graphic controller 24d are interconnected over a control bus 24e. Moreover, a RAM 24f dedicated to graphics is connected to the graphic controller 24d.

Furthermore, a serial communication interface (serial interface) 24g is connected over the control bus 24e. The serial communication interface 24g enables communication of control information to the CPU incorporated in each of the apparatuses having different functions (DSP control CPU 48 or angle control CPU 31), and also enables communication of operational information to the remote control CPU 81.

(Functions)

Next, a description will be made of operations to be exerted by the endoscope system 1 of the present embodiment having the foregoing components.

Communication of the system control CPU 24 in the control unit 23 with the angle control CPU 31 in the motor-driven angling unit 17, the DSP control CPU 48 in the CCU 16, or the remote control CPU 81 in the remote control unit 8 over the signal line 85, 86, or 87 may be either serial communication or parallel communication. In the present embodiment, serial communication (using an interface conformable to the RS-232C, the USB, or the IEEE 1394) is adopted, and carried out according to a protocol stipulated for the basic system 24.

A description will be made of the protocol stipulated for the basic system 24 and adopted for serial communication over the signal line 85, 86, or 87 (using an interface conformable to the RS-232C, USB, or IEEE 1394).

Figure 4:
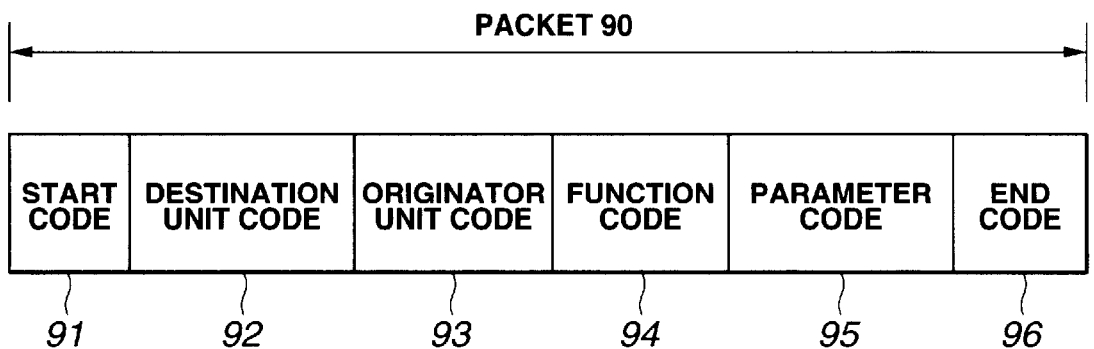

As shown in FIG. 4, according to the protocol stipulated for the basic system 25, a control command is transferred in the form of a packet 90 between the apparatuses over the signal line 85, 86, or 87. The packet 90 consists of a start code 91, a destination unit code 93, an originator unit code 93, a function code 94, a parameter code 95, and an end code 97. Table 1 lists the types of codes and the descriptions thereof.

TABLE 1

| Code | Description |
|---|---|
| Start code | This indicates the start of a packet. (X: command, Y: response) |
| Destination unit code | This indicates a unit that is a destination of a command. |
| Originator unit code | This indicates a unit that is an originator of a command. |
| Function code | This is a sequence of instructions that defines a function to be controlled. |
| Parameter code | This represents a parameter value specified for the function to be controlled. |
| End code | This indicates the end of a packet. |

(1) The start code 91 is a code indicates the start of the packet 90. For example, start code X indicates the start of a command. Start code Y indicates the start of a response to a command.
(2) The destination unit code 92 is a code indicating a destination unit of a command.
(3) The originator unit code 93 is a code indicating an originator unit of a command.
(4) The function code 94 is a sequence of instructions that defines a function to be controlled.
(5) The parameter code 95 represents a parameter value specified for a function to be controlled.
(6) The end code 96 is a code indicating the end of the packet 90.

According to the protocol based on the above command transmission form, control information and acknowledge information are transmitted over the serial communication line of the signal line 85, 86, or 87.

An apparatus indicated with the destination unit code 92 receives control information addressed to the apparatus itself, interprets a sequence of instructions that defines a feature to be controlled and that is assigned to the function code 94, selects a control mode, and sets the parameter value specified for the function to be controlled and represented by the parameter code 95.

An inquiry command about a command is transmitted with start code Y appended thereto. Besides, it can be checked if communication control has been extended accurately.

For example, the remote control CPU 81 in the remote control unit 8 transmits control information, which is used to control the motor-driven angling unit 17 responsively to a manipulation performed on the angle lever 83, to the system control CPU 24 according to the protocol based on the foregoing command transmission form. The plurality of switches 82 is used to select a control mode.

Control modes in which the remote control unit 8 extends control include, for example, a mode in which the exposure time of the CCD 41 incorporated in the industrial endoscope 3 is controlled, and a mode in which image processing by the DSP 47 in the CCU 16 is controlled.

For controlling the exposure time of the CCD 41 in the industrial endoscope 3, a user can set the upper limit for a long exposure time to any value ranging from $\frac{1}{60}$ sec to 10 sec. Consequently, the exposure time is automatically switched from $\frac{1}{60}$ sec up to the set upper limit for a long exposure time according to a target brightness level a user designates separately. Therefore, once a user designates the upper limit for a long exposure time, appropriate brightness can always be attained with sectors moved slowly.

When it comes to observation of an intraluminal region, an intraluminal wall is an object of observation. A reference brightness level to be counted on in conventional image processing is the brightness level of the center of an image. A shutter speed and a gain are determined so that the center of an image can be viewed with proper brightness. In processing an endoscopic image that represents an intraluminal wall which is an object of observation, the center of an image represents a hollow and appears dark. This poses a problem that the object of observation cannot be observed with proper brightness.

For controlling image processing to be performed by the DSP 47 in the CCU 16, for example, an endoscopic image is divided into a plurality of areas including a center area. A weight for the brightness of the center area is set to 0. The brightness levels of the other areas are weighted with proper values. Thus, a reference brightness level is set to the brightness level of the inner wall of a lumen.

The remote control unit 8 may be provided with a video output terminal and an audio output terminal, and image data or voice data may be sent to the remote control unit 8 over the signal line 85, 86, or 87 according to the protocol stipulated for the basic system 25. In this case, a display device that is an LCD or a loudspeaker may be plugged in to the video output terminal or audio output terminal. Thus, the display device can be installed at a position permitting easy observation. Moreover, a face-mounted display (FMD) shaped like spectacles and provided with LCDs that substitute for the lenses of the spectacles may be plugged in to the video output terminal or audio output terminal. In this case, a user can always view an optimal endoscopic image irrespective of the user's posture for observation.

Moreover, a nonvolatile memory (EEPROM) that is a reprogrammable memory may be included in each apparatus. A personal computer for adjustment may be plugged in to the connector 84 through which the remote control unit 8 is connected. In this case, when started up, the system control CPU 24 in the control unit 23 judges whichever of the remote control unit 8 and the personal computer for adjustment is plugged in to the connector 84. If the system control CPU 24 judges that the personal computer for adjustment is connected, the system control CPU 24 sets the basic system 25 to an adjustment mode. Thus, the basic system 25 can be easily adjusted using the personal computer for adjustment. Moreover, when an EEPROM is incorporated in each apparatus, error information acquired before adjustment is performed using the personal computer for adjustment can be read in order to identify a malfunction.

Furthermore, when an EEPROM is incorporated in each apparatus, information of set values designated at the time of previous use can be stored in the EEPROM. Each apparatus can be started up under a desired state without the necessity of communication.

When serial communication is performed through an interface conformable to the RS-232C, a standard signal level is normally 12 Vp-p. In the basic system 25 accommodating short signal lines, 5 Vp-p may be adopted. In this case, power consumption is limited and a communication network can be simplified.

(Advantages)

As described previously, according to the present embodiment, the apparatuses constituting the endoscope system are controlled in a centralized manner through communication. The remote control unit 8 alone is used to issue control instructions. The complex functions of the apparatuses constituting the endoscope system 1 can be controlled in a centralized manner. This leads to improved ease of use.

The apparatuses constituting the endoscope system 1 are connected to one another using serial communication signal lines. For example, when the RS-232C is adopted for communication, if only a cable contains two communication lines of a reception data line and a transmission data line is used as a communication line linking apparatuses, the apparatuses can communicate to each other. A connection between apparatuses can be established readily. This leads to a small number of signal lines.

Furthermore, when a drum-inclusive structure is adopted for the endoscope system, apparatuses stowed in the drum and apparatuses located outside the drum are communicated to one another using serial interfaces. In this case, the number of communication lines linking the exterior of the drum and the interior thereof can be reduced. This is quite advantageous.

Furthermore, when image data is transmitted/received over a serial communication line, a high-speed communication means conformable to the USB or IEEE 1394 can be adopted so that the image data can be transferred efficiently.

Figure 5:
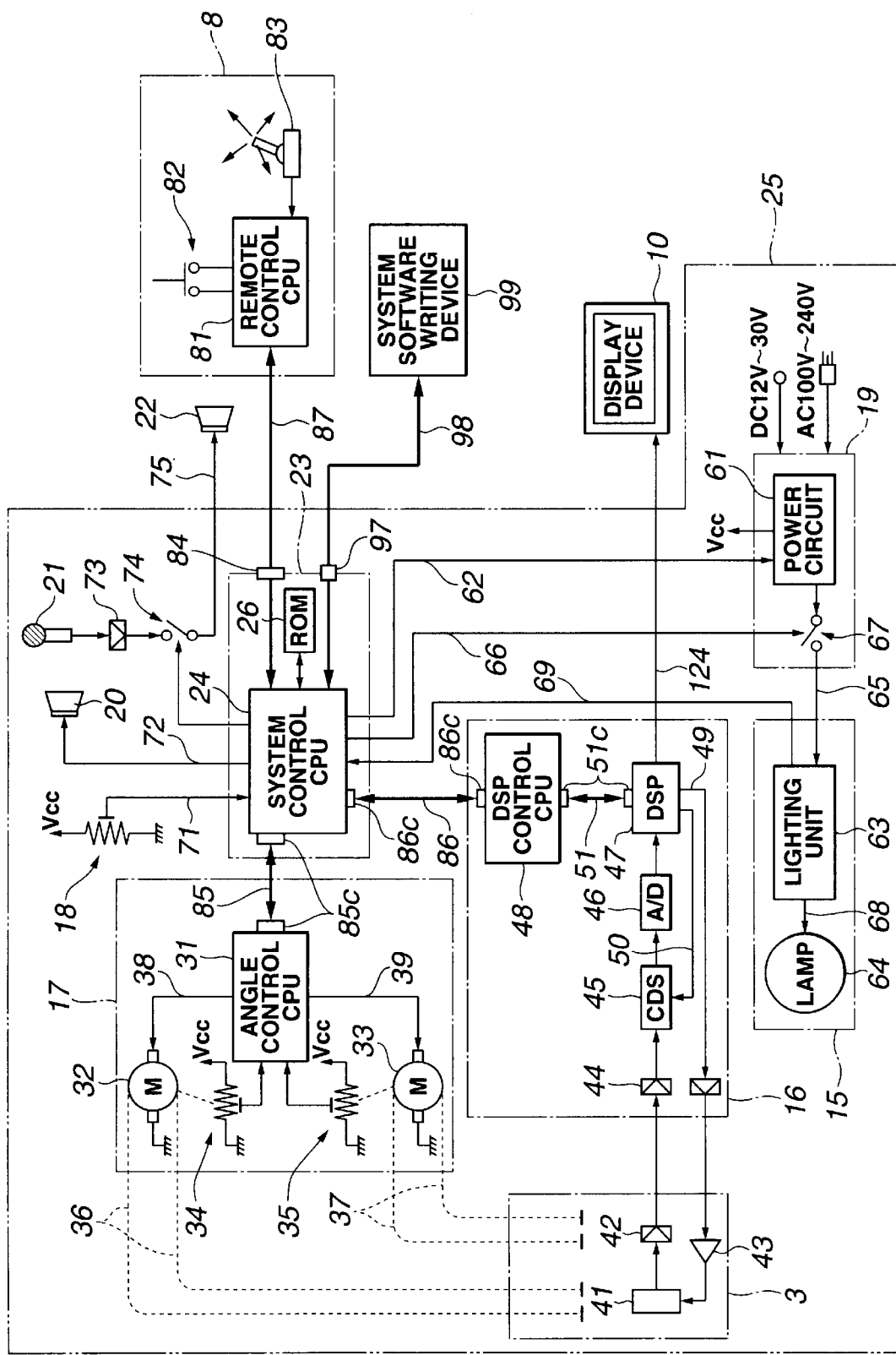

In the basic system 25, as shown in FIG. 5, a system software writing device 99 may be connected to the system control CPU 24 through a connector 97 over a signal line 98 according to the aforesaid protocol.

In a conventional endoscope system, the function of each of the apparatuses constituting the endoscope system is predefined with hardware and software that constitute the apparatus. When the function of an apparatus must be modified, the hardware and software constituting the apparatus must be modified.

When the system software writing device 99 is, as shown in FIG. 5, connected to the system control CPU 24 of the basic system 25, the system software writing device 99 can be used to upgrade the version of a system control program that describes a sequence of instructions to be followed by the system control CPU 24, or to change a user-specified setting. Otherwise, the system software writing device 99 may be used to write system software, which may be an English version, German version, or French version produced exclusively for a destination of the endoscope system, in the ROM 26. The functions of the endoscope system can thus be changed easily. The ROM 26 is a reprogrammable nonvolatile memory (EEPROM).

Second Embodiment

A second embodiment is nearly identical to the first embodiment. Differences alone will be described. The same reference numerals will be assigned to components identical to those of the first embodiment, and the description of the components will be omitted.

(Constituent Features)

Figure 6:
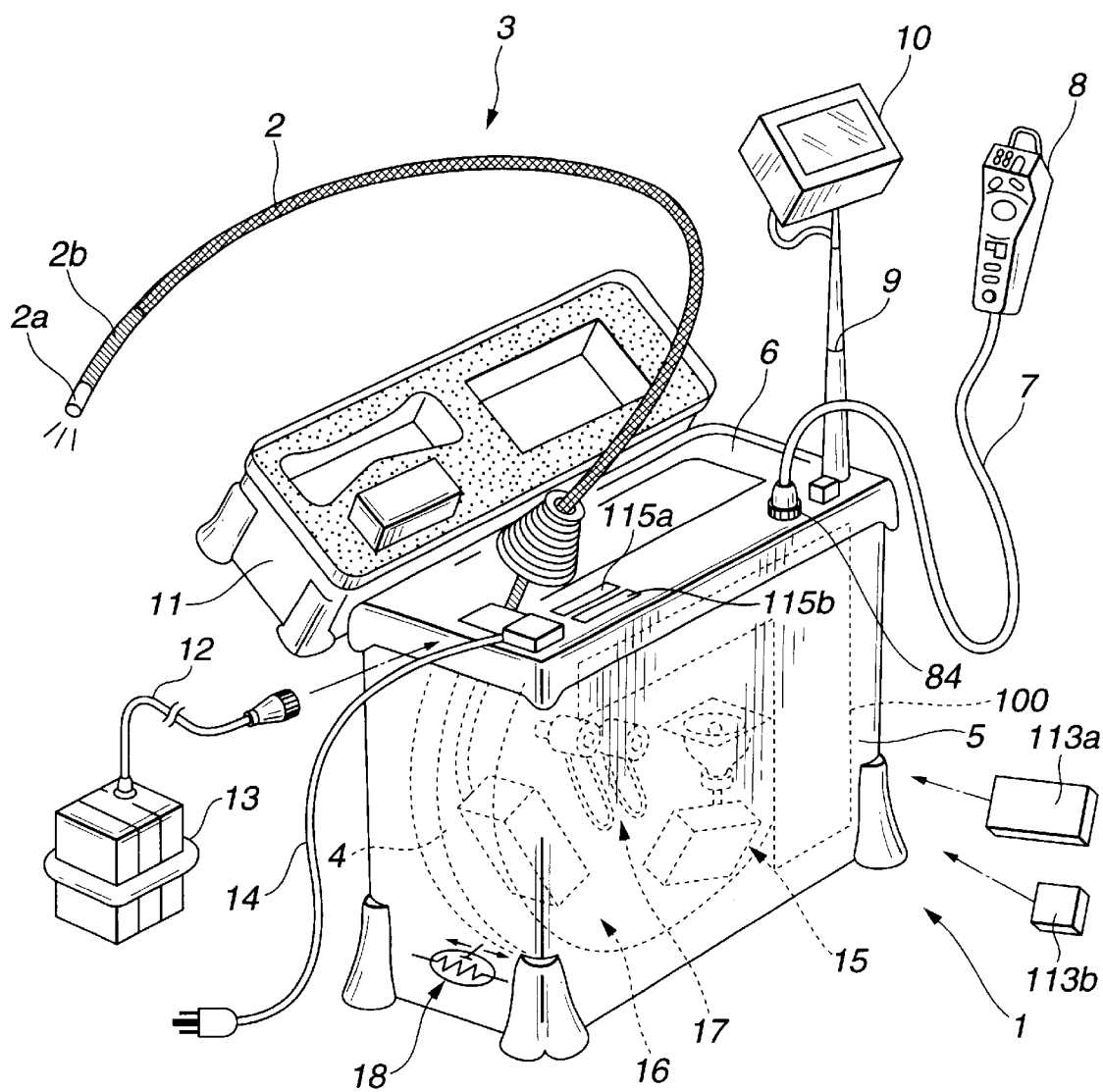
FIG. 6 to FIG. 10 are concerned with the second embodiment of the present invention.

As shown in FIG. 6, an endoscope system 1a of the present embodiment has, in addition to the basic system 25, an image recording unit 100 incorporated in the main unit 5 as a function expansion unit.

Figure 7:
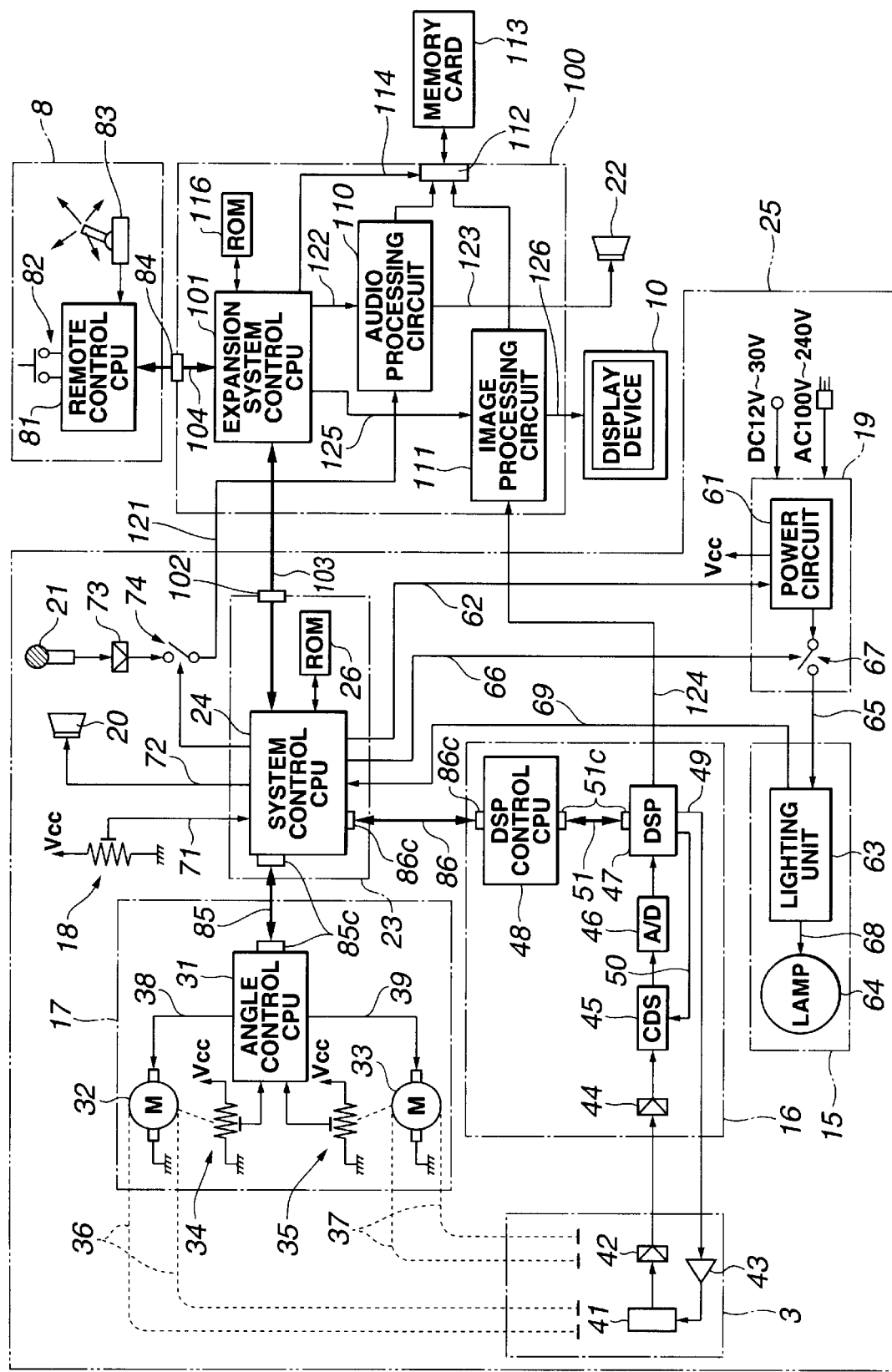

As shown in FIG. 7, an expansion system control CPU 101 is incorporated in the image recording unit 100. The expansion system control CPU 101 in the image recording unit 100 is connected to the system control CPU 24 through a connector 102 over a signal line 103. The remote control CPU 81 in the remote control unit 8 is connected to the expansion system control CPU 101 through the connector 84 over a signal line 104.

Communications over the signal line 103 and signal line 104 respectively are performed according to the protocol stipulated for the basic system 25 as described in relation to the first embodiment.

An audio processing circuit 110 and an image processing circuit 111 are incorporated in the image recording unit 100. The audio processing circuit 110 digitally processes a voice signal transferred from the microphone 21. The image processing circuit 111 digitally processes an image signal produced by the DSP 47 in the CCU 16. Moreover, digital data processed by the audio processing circuit 110 and image processing circuit 111, which are controlled by the expansion system control CPU 101, is written or read in or from a detachable memory card 113 through a card connector 112. Moreover, reading or writing through the card connector 113 is controlled using a card control signal 114 sent from the expansion system control CPU 101.

An endoscopic image processed by the image processing circuit 111 is displayed on the display device 10, and voice processed by the audio processing circuit 110 is transferred to the loudspeaker 22.

A ROM 116 connected to the expansion system control CPU 101 is a memory in which a program describing a sequence of instructions, which determines the function of the expansion system control CPU 101 of extending control, is stored.

The memory card 113 consists, as shown in FIG. 6, of a PCMCIA card 113a and a compact flash (CF) card 113b. A PCMCIA slot 115a and a CF slot 115b are therefore formed as the card connector 112 in the front panel 6.

The other components are identical to those of the first embodiment.

(Function)

A voice signal 121 sent from the microphone 21 is transferred to the audio processing circuit 110, and treated based on a control audio signal 122 sent from the expansion system control CPU 101. The audio processing circuit 110 converts the voice signal 121 into a digital form in which data can be recorded in the memory card 113, and reads or writes the digital data from or on the memory card 113. The signal processed by the audio processing circuit 110 is transferred as a voice signal 123 to the loudspeaker 22.

An image signal 124 sent from the DSP 47 in the CCU 16 is transferred to the image processing circuit 111, and treated based on a control image processing signal 125 sent from the expansion system control CPU 101. The image signal 124 is converted into a digital form, in which data is recorded in the memory card 113, by the image processing circuit 111. The image signal is written or read on or from the memory card 113. Image processing of dimension measurement is executed.

The image signal processed by the image processing circuit 111 is transferred as an image signal 126 to the display device 10.

According to the present embodiment, the system control CPU 24 is a slave to the expansion system control CPU 101, and controlled based on a control command sent from the expansion system control CPU 101 over the signal line 103.

Based on control information sent from the remote control unit 8 over the signal line 104, the expansion system control CPU 101 controls the image recording unit 100. Furthermore, control information sent from the remote control unit 8 is transferred to the system control CPU 24 over the signal line 103, whereby all the apparatuses connected to the system control CPU 24 can be controlled.

The other operations are identical to those of the first embodiment.

(Advantage)

As mentioned above, the present embodiment provides the same advantages as the first embodiment. In addition, when the software system installed in the endoscope system is expanded, the expansion system control CPU 101 controls the whole expanded system according to control information entered at the remote control unit 8. This permits centralized operation using the remote control unit 8. An expansion function can be utilized through simple operation of the remote control unit. Moreover, even when a software system is modified, the modified system can be operated in the same manner as it is before modified. This results in improved user's operability.

Even in the present embodiment, the system software writing device 99 shown in FIG. 5 and employed in the first embodiment can be connected.

Figure 8:
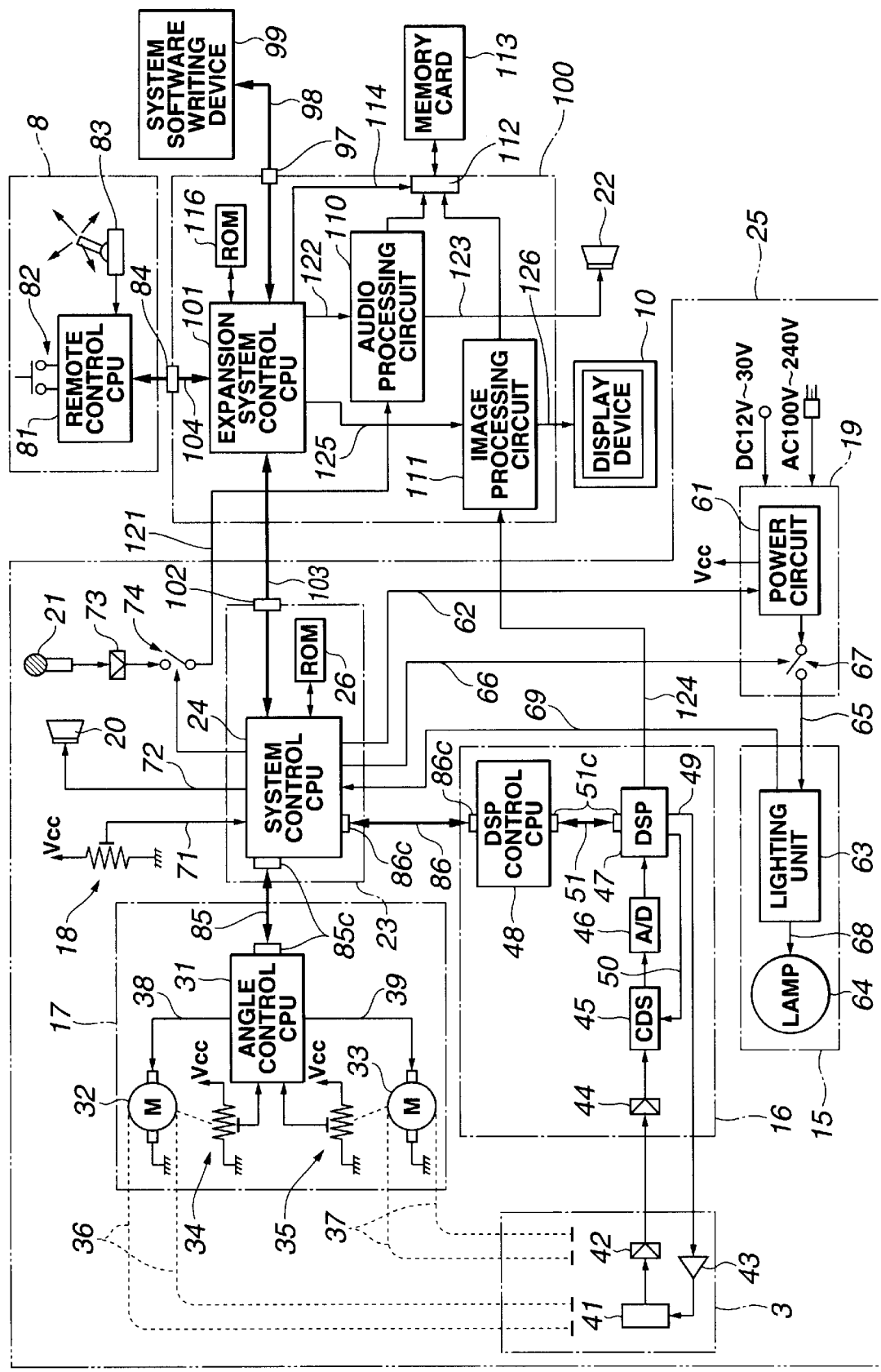

To be more specific, as shown in FIG. 8, the system software writing device 99 is connected to the expansion system control CPU 101 through a connector 97 over a signal line 98 according to the aforesaid protocol. Consequently, the system software writing device 99 is used to upgrade the version of a system control program that describes a sequence of instructions to be followed by the expansion system control CPU 101, or to change a user-specific setting. Besides, the system software writing device 99 may be used to write system software, which may be an English version, a German version, or a French version produced exclusively for a destination of the endoscope system, in the ROM 116. Thus, the system software writing device 99 can be used to easily modify any of the functions of the endoscope system. In this case, the ROM 116 is reprogrammable nonvolatile memory (EEPROM).

Moreover, the memory card 113 may be substituted for the system software writing device 99 for the purpose of reprogramming system software. Specifically, system software may be read or written from or on the memory card 113.

Figure 9:
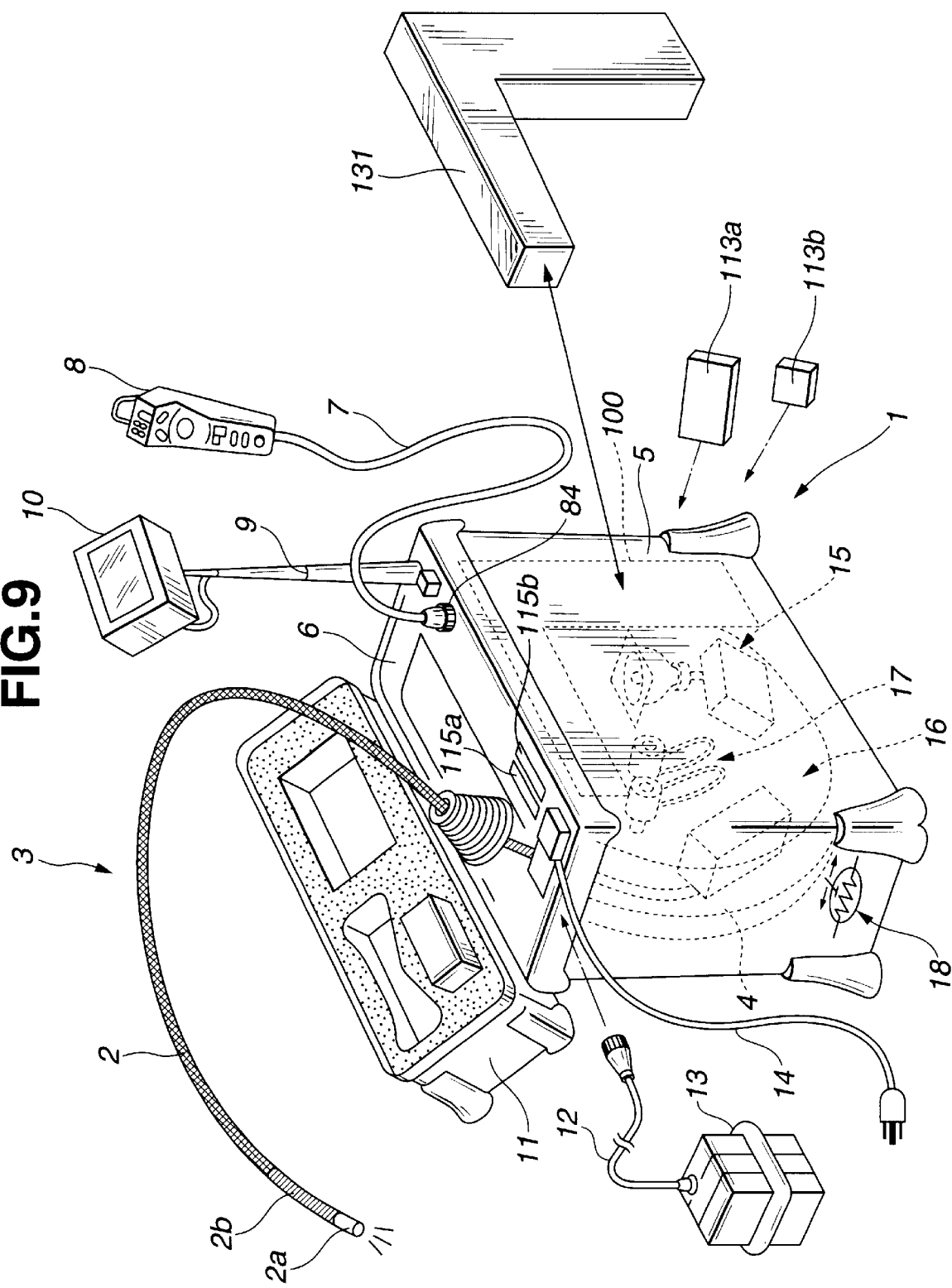
Figure 10:
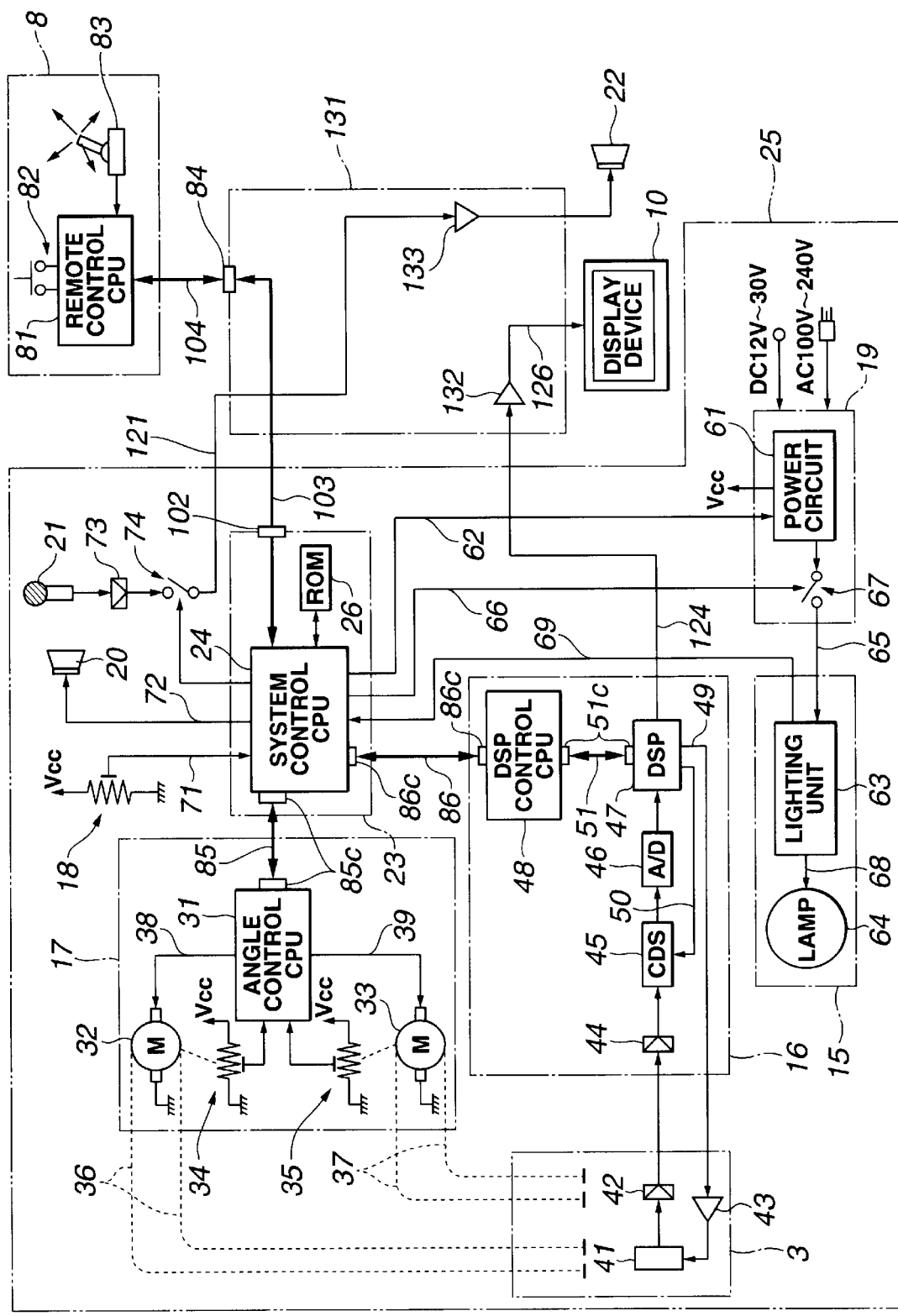

Moreover, as shown in FIG. 9, the endoscope system 1a may include a buffer unit 131, which is interchangeable with the image recording unit 100, instead of the image recording unit 100.

In the buffer unit 131, a video signal 124 sent from the DSP 47 is temporarily stored in a video buffer 132, and transferred to an LCD panel of the display device 10. Consequently, a view image is displayed on the display device 10. A voice signal 121 received from the microphone 21 is temporarily stored to an audio buffer 133 in the buffer unit 131, and transferred to the loudspeaker 22.

When the buffer unit 131 is employed, the system control CPU 24 acts as a master computer system and controls the whole endoscope system.

Owing to the employment of the buffer unit 131, even when an endoscope system is modified, the modified endoscope system can be operated in the same manner. This results in improved user's operability. Moreover, the buffer unit 131 and image recording unit 100 are interchangeable with each other. Once the endoscope system is expanded, the buffer unit 133 is substituted for the image recording unit 100, and the endoscope system is sophisticated. Thus, the endoscope system can be expanded to have an additional function without an increase in the size thereof.

Third Embodiment:

A third embodiment is nearly identical to the second embodiment. Differences alone will be described below. The same reference numerals will be assigned to components identical to those of the second embodiment, and the description of the components will be omitted.

(Constituent Features and Functions)

Figure 11:
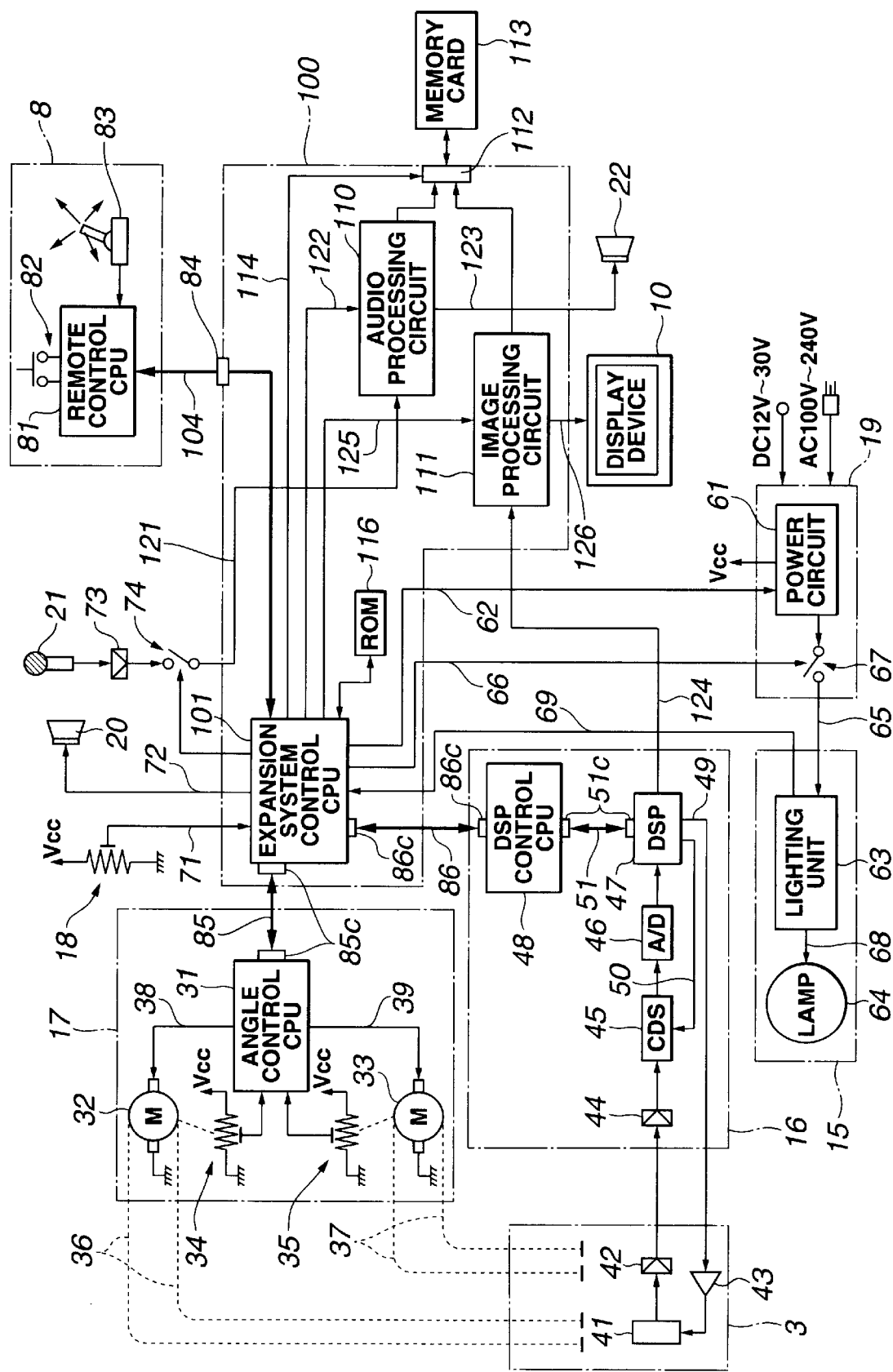
FIG. 11 to FIG. 13 are concerned with a third embodiment of the present invention.

As shown in FIG. 11, an endoscope system 1b in accordance with the present embodiment is devoid of the control unit 23 that includes the system control CPU 24. The expansion system control CPU 101 incorporated in the image recording unit 100 covers all the functions of the system control CPU 24. The other components of the present embodiment and the operations thereof are identical to those of the second embodiment.

(Advantages)

As mentioned above, the present embodiment provides the same advantages as the second embodiment. In addition, since the expansion system control CPU 101 covers all the functions of the system control CPU 24, the control unit 23 is unnecessary. This results in an endoscope system having a simpler configuration.

Figure 12:
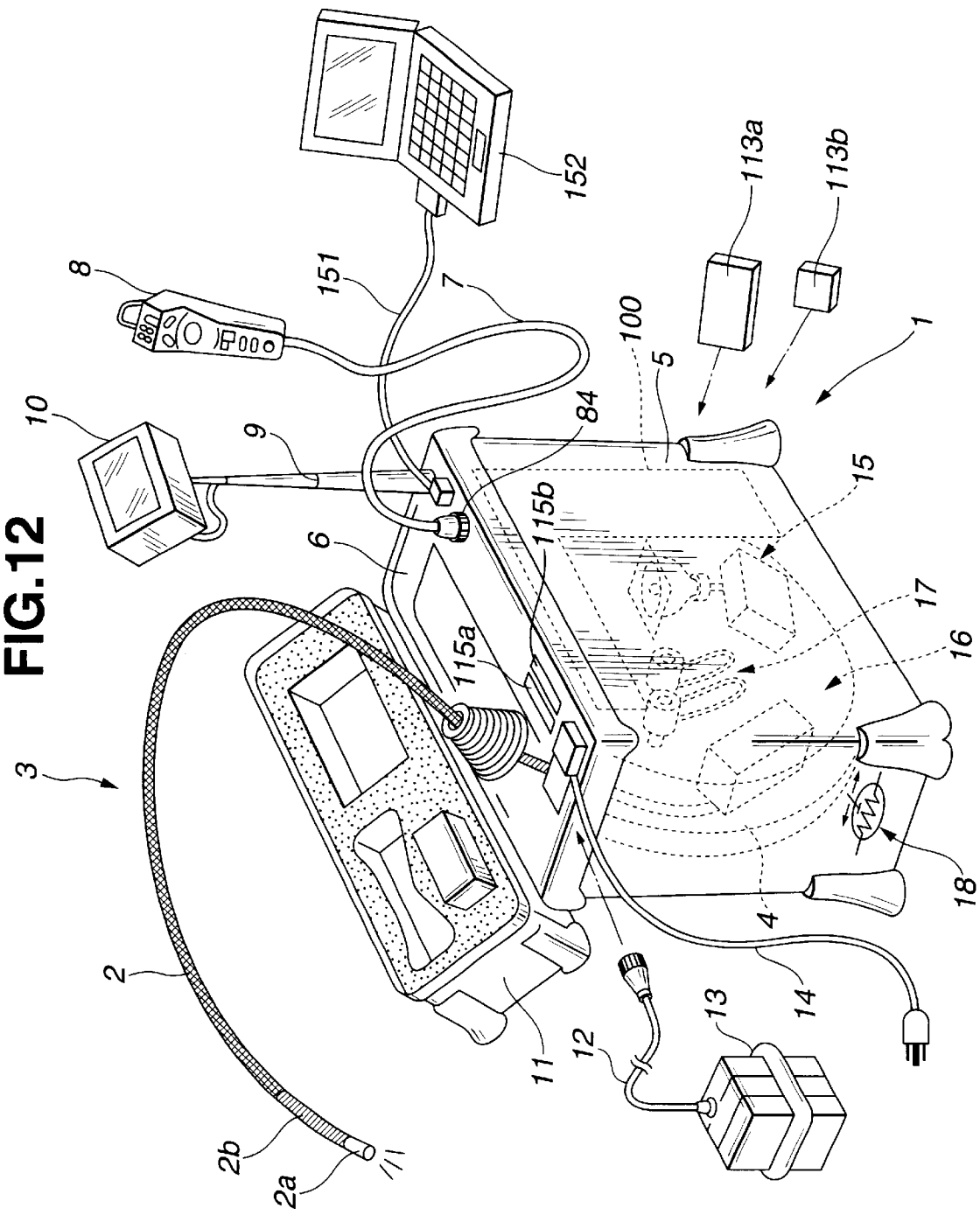
Figure 13:
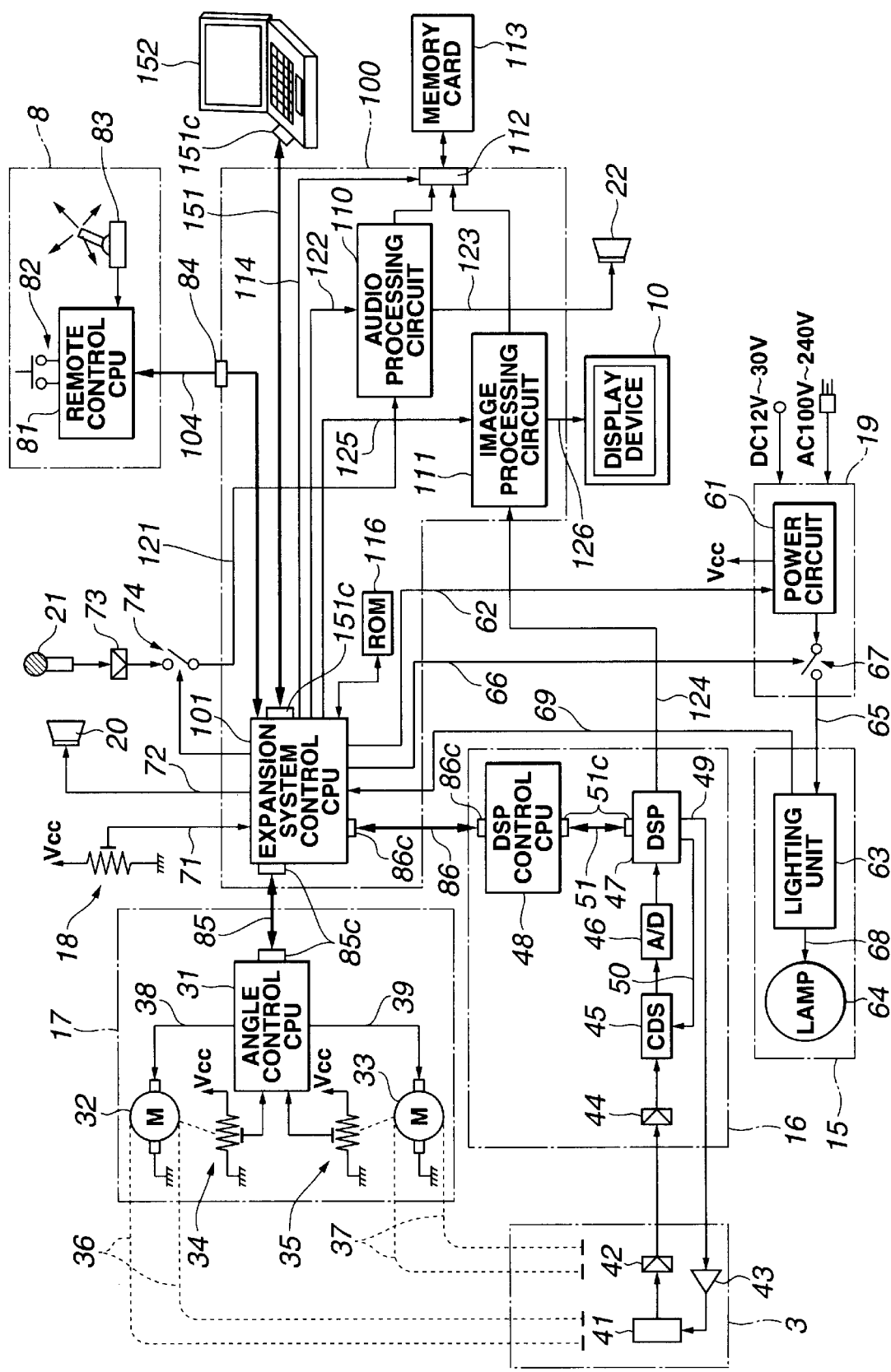

As shown in FIG. 12 and FIG. 13, an external personal computer 152 may be connected to the expansion system control CPU 101 over a signal line 151. In this case, communication over the signal line 151 is performed based on the aforesaid protocol stipulated for the basic system 25 as described in relation to the first embodiment. The external personal computer 152 may be operated instead of the remote control unit 8. The signal line 151 has detachable connectors 151c attached to the ends thereof, and the connectors 151c are joined to the system control CPU 24 and external personal computer 152 respectively.

The endoscope system and external personal computer 152 are connected through serial communication (using an interface conformable to the RS-232C, USB, or IEEE 1394). The serial communication is performed based on the aforesaid protocol that is stipulated for the basic system 25 as described in relation to the first embodiment. The apparatuses constituting the endoscope system are controlled through the serial communication to the external personal computer 152. Moreover, the features of the apparatuses can be assessed through the serial communication. Control commands and data used to control the motor-driven angling unit 17 can be issued from the external personal computer 152 over the serial communication line. Namely, the motor-driven angling unit 17 can be controlled using the serial communication line. Moreover, a high-speed communication means conformable to the USB or IEEE 1394 can be used to transfer image data over a serial communication line. Data can therefore be efficiently transferred to or from the external personal computer 152.

Fourth Embodiment

Incidentally, when a CCD incorporated in the tip part of a conventional endoscope requires a driving signal composed of bipolar voltage pulses, a camera control unit (CCU) transmits the bipolar voltage pulses according to a voltage required for the CCD.

In this case, the CCU must produce both positive and negative voltages to drive the CCD. A circuit for generating bipolar voltage pulses must therefore be included in a drive circuit for driving the CCU. This leads to an increase in the size of the CCU.

Another means for applying bipolar voltage pulses to the CCD is incorporation of an integrated circuit, which requires positive and negative voltages for the purpose of producing bipolar voltage pulses, in the tip part of an endoscope. However, it is necessary to apply both positive and negative voltages to the tip part of the endoscope. Moreover, two bypass capacitors are needed in order to stabilize the positive and negative voltages to be applied to the integrated circuit incorporated in the tip part of the endoscope. Furthermore, positive and negative voltage lines must be passed through the endoscope. This leads to an increase in the number of signal lines that determines the diameter of an endoscope, which is disadvantageous in determining the diameter of an insertion member of the endoscope.

Related arts will be described in conjunction with FIG. 14, FIG. 15, and FIG. 16.

Figure 14:
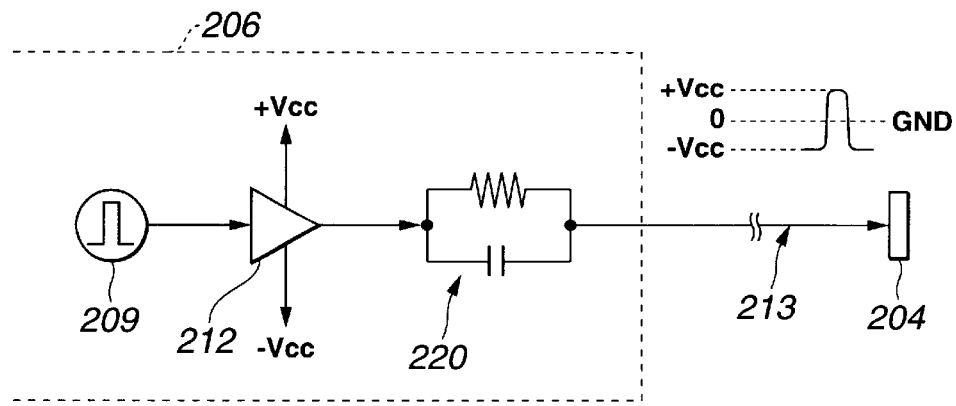
FIG. 14 to FIG. 18 are concerned with a fourth embodiment of the present invention.

FIG. 14 shows an example of the circuitry of the CCU 206 that directly drives the CCD 204. A bipolar voltage driving pulse generation circuit 212 is a drive circuit incorporated in the CCU 206 in order to drive the CCD 204. This driving method has the merit of making the structure of the tip part of an endoscope simple. However, since a very thin signal line inherent to an endoscope is used to transmit driving pulses, a cable driving pulses 213 has the leading edge and trailing edge thereof, as shown in FIG. 14, rounded because of the capacitance and impedance offered by a cable while being transmitted from the CCU 206 to the CCD 204.

When the CCD must be driven, if driving pulses to be applied to horizontally sweep the CCD distorts, the efficiency in horizontally sweeping the CCD deteriorates.

In efforts to prevent the above phenomenon, a wave enhancement circuit 220 is incorporated in the CCU 206. The cable driving pulses 213 are transmitted in consideration of a level by which the pulses decay.

However, the employment of the wave enhancement circuit has limits in improving the leading edge and trailing edge of each pulse. The pulses therefore distort despite the efforts. Moreover, since the wave enhancement circuit transmits the pulses with the leading edges thereof and the trailing edges thereof enhanced, electromagnetic interference that degrades the performance of the CCU 206 increases.

In efforts to improve the distortion of a wave described in conjunction with FIG. 14, a regenerative repeater integrated circuit 214 requiring positive and negative voltages is placed by the side of the CCD 204 incorporated in the tip part of the endoscope.

Figure 15:
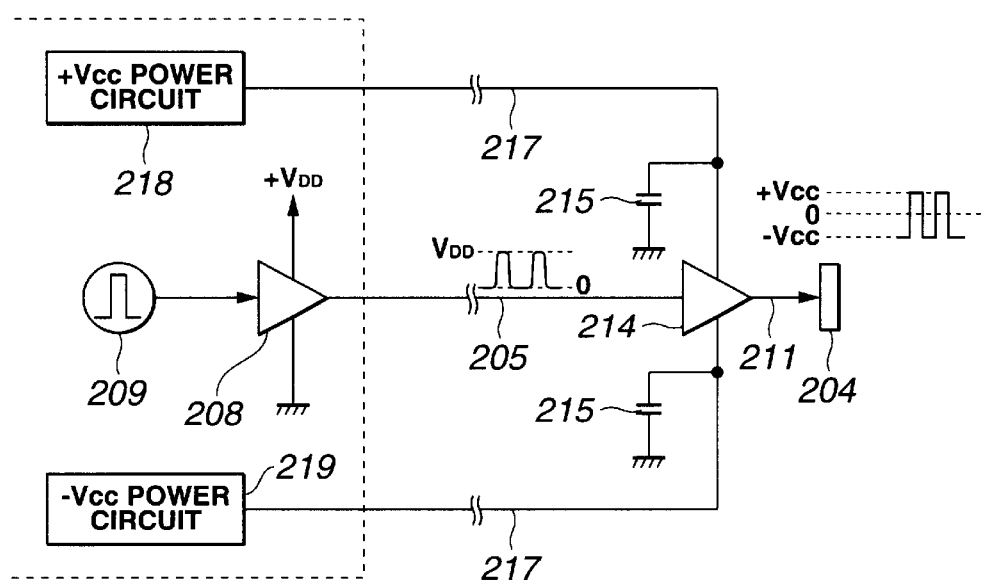

In the related art shown in FIG. 15, the regenerative repeater integrated circuit 214 requiring positive and negative voltages regenerates driving pulses (5) sent from the CCU and restores the original waveform of the pulses so that bipolar driving pulses 211 whose leading edges and trailing edges are reshaped can be transferred to the CCD 204.

Figure 16:
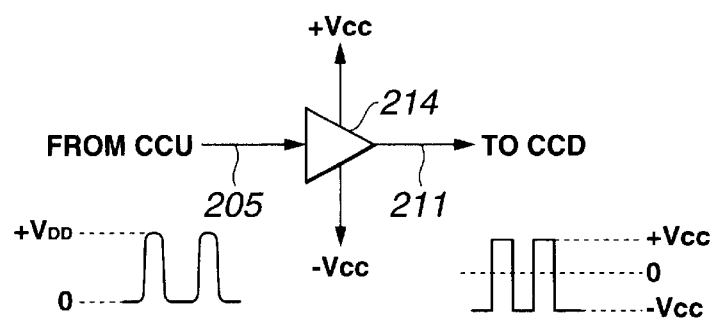

FIG. 16 shows the capability of a regenerative repeater. The regenerative repeater integrated circuit 214 requiring positive and negative voltages regenerates driving pulses 205 sent from the CCU 206 and restores the original waveform of the pulses because the driving pulses 205 have distorted. The integrated circuit 214 then produces the bipolar driving pulses 211 which is transferred to the CCD and whose leading edges and trailing edges are improved.

In the related art shown in FIG. 15, positive and negative supply voltages must be applied to the regenerative repeater integrated circuit 214 requiring positive and negative voltages. A positive voltage line 216 and a negative voltage line 217 are therefore extended from the CCU 206.

When the positive and negative supply voltages must be applied to the regenerative repeater integrated circuit 214 requiring positive and negative voltages, very thin cables are used to apply the positive and negative supply voltages. Therefore, high impedance is induced at power terminals in the tip part of the endoscope. This makes the supply voltages unstable.

For this reason, the bypass capacitors 251 for positive and negative voltages are needed in order to lower the impedance induced at the power terminals and stabilize the supply voltages.

A positive supply voltage generation circuit 218 and a negative supply voltage generation circuit 219 are incorporated in the CCU 206 in order to apply supply voltages.

As described above, according to the related art, as shown in FIG. 14, when the CCU directly drives the CCD, driving pulses are distorted and the efficiency in horizontally sweeping the CCD is degraded.

In efforts to overcome the above drawback, the regenerative repeater integrated circuit is, as shown in FIG. 15, incorporated in the tip part of the endoscope. However, for producing bipolar voltage pulses, it is necessary to include positive and negative power lines so as to apply positive and negative voltages to the integrated circuit. This leads to an increase in the diameter of the endoscope. Besides, the positive and negative bypass capacitors are needed in order to stabilize the positive and negative supply voltages to be applied to the tip part of the endoscope. This makes the structure of the tip part complex. Eventually, the tip part becomes large in size, and the rigid part of the endoscope becomes long.

According to a CCD driving method employed in the present embodiment, even when a CCD that requires bipolar driving pulses is incorporated in an endoscope, a CCD drive circuit does not become complex. Besides, the circuitry in the tip part of the endoscope can be simplified and small-sized. Besides, the number of signal lines running through the insertion member of the endoscope need not be increased, and the endoscope can be made thinner. The CCD driving method will be described below.

Figure 17:
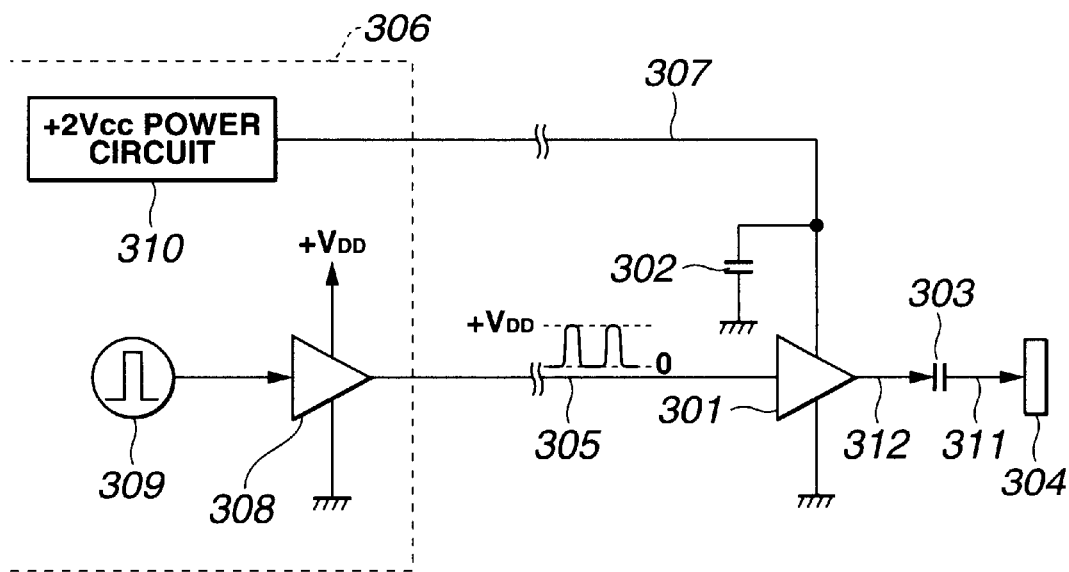

Referring to FIG. 17, an endoscope system 300 consists mainly of a regenerative repeater integrated circuit 301 requiring positive or negative voltage, a bypass capacitor 302 for positive or negative voltage, an AC coupling capacitor 303, a CCD 304, a CCU 306, a positive or negative supply voltage line 307, a CCU drive circuit 308 requiring positive or negative voltage, an SSG 39, and a +2 Vcc power circuit 310.

According to the present embodiment, the SSG 309 incorporated in the CCU 306 generates pulses. The pulses are transferred to the CCU drive circuit 308 requiring positive or negative voltage, whereby driving pulses 305 are generated.

The driving pulses 305 are applied to the regenerative repeater integrated circuit 301 requiring positive or negative voltage. The integrated circuit 301 produces unipolar pulses 312 that succeed the improved leading and trailing edges of the driving pulses. The unipolar pulses 312 are passed through the AC coupling capacitor 303. Resultant bipolar driving pulses 311 are applied to the CCD 304. The +2 Vcc power circuit 310 transfers a supply voltage, which is also transferred to the regenerative repeater integrated circuit 301 requiring positive or negative voltage and incorporated in the CCU 306, to the tip part of the endoscope over the positive or negative supply voltage line 307.

The bypass capacitor 302 for positive or negative voltage stabilizes the voltage developed at the +2 Vcc terminal in the tip part.

Figure 18:
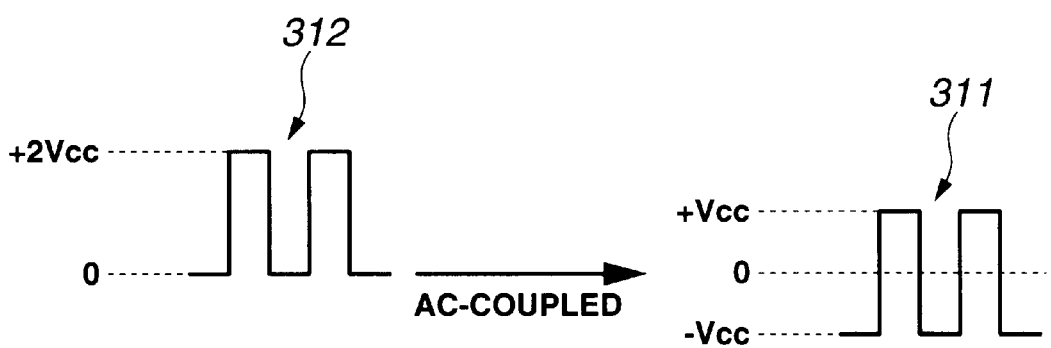

Referring to FIG. 18, the operation of the regenerative repeater integrated circuit 301 requiring positive or negative voltage will be described below. The regenerative repeater integrated circuit 301 requiring positive or negative voltage receives the driving pulses 305, and converts the driving pulses 305 into the unipolar pulses 312 that have the leading and trailing edges thereof improved and alternate within the range from 0 to +2 V. The unipolar pulses 312 are passed through the AC coupling capacitor 303, whereby the level of a direct voltage component of each pulse is shifted. Thus, the bipolar driving pulses 311 to be applied to the CCD are produced.

As mentioned above, according to the present embodiment, unipolar driving pulses are applied to the regenerative repeater integrated circuit that requires positive or negative voltage, and then passed through the AC coupling capacitor. Thus, the bipolar driving pulses are produced and applied to the CCD.

In the present embodiment, one bypass capacitor is needed for stabilizing a supply voltage and incorporated in the tip part of the endoscope. Compared with the configuration including two power supplies for positive and negative voltages, the configuration including the bypass capacitor alone is desirable for a compact design. Moreover, only one power line is needed for applying positive or negative to the regenerative repeater integrated circuit incorporated in the tip part of the endoscope. The number of required power lines is thus decreased compared with when two power lines are needed for applying positive and negative voltages. Thus, the number of signal lines that determines the outer diameter of the insertion member of the endoscope is decreased, and the endoscope is made thinner.

In the present embodiment, the bipolar driving pulses are produced using the AC coupling capacitor and applied to the CCD. Therefore, only one bypass capacitor must be incorporated in the tip part of the endoscope in order to stabilize a supply voltage. This leads to the small-sized tip part of the endoscope. The rigid part of the tip part of the endoscope can be shortened.

Moreover, only one power line is needed to apply positive or negative voltage to the regenerative repeater integrated circuit incorporated in the tip part of the endoscope. Thus, the number of signal lines that determines the outer diameter of the insertion member of the endoscope is decreased. Eventually, the endoscope can be made thinner.

Having described the preferred embodiments of the invention referring to the accompanying drawings, it is to be understood that the invention is not limited to those precise embodiments and that various changes and modifications thereof could be effected by one skilled in the art without departing from the spirit or scope of the invention as defined in the appended claims.

What is claimed is:

1. An electronic endoscope system comprising:
   an endoscope including an elongated insertion member, a light guide that is passed through the insertion member, an imaging device incorporated in a tip part that communicates with the insertion member, and a pair of angulation wires that is passed through the insertion member and coupled to the tip part in order to angle the tip part;
   a lamp located at a position supplying illumination light over the light guide;
   a camera control unit including a video signal processor that processes an image signal from the imaging device, and a first controller that controls the operation of the video signal processor;
   an angulation wire control unit including a motor that drives the pair of angulation wires, and a second controller that controls the motor;
   a system control unit including a first connector through which communication data is transmitted/received to or from, and a system controller that outputs communication data, which is used to extend control, to the first controller or the second controller according to communication data received from the first connector;
   an expansion function unit including a function expansion circuit, which is connected to the system control unit through the first connector so that the function expansion circuit can be disconnected freely, an expansion function controller that controls the function expansion circuit intended to expand the endoscope system, and transmits/receives control information to or from the system controller, and a second connector through which communication data is transmitted/received to or from the expansion function controller;
   a remote control unit being plugged into the first connector or the second connector so that the remote control unit can be unplugged freely, and including a plurality of operation switches that is used to operate the camera control unit, the angulation wire unit, or the function expansion circuit, and a remote controller that transmits communication data, which is used for operation, responsively to a manipulation performed on any of the plurality of operation switches.

2. An electronic endoscope system according to claim 1, further comprising:
   an integrated circuit that is incorporated in the tip part and requires positive or negative voltage to act as a regenerative repeater that regenerates driving pulses, which are outputted by the video signal processor in order to drive the imaging device, to restore the original waveform of the driving pulses; and
   a capacitor for AC-coupling the driving pulses regenerated by the integrated circuit,
   wherein bipolar voltage driving pulses are generated in order to drive the imaging element.

3. An electronic endoscope system according to claim 1, wherein transmitting/receiving data between the system control unit, and the camera control unit, the angulation wire control unit, the expansion function unit, or the remote control unit is achieved according to a predetermined protocol.

4. An electronic endoscope system according to claim 1, wherein the expansion function unit selectively records at least received data on an external recording medium.

5. An electronic endoscope system according to claim 1, wherein a control program that describes a sequence of instructions to be followed by the system controller in the system control unit, or a control program that describes a sequence of instructions to be followed by an expansion function controller in the expansion function unit can be rewritten.

6. An electronic endoscope system comprising:
   an endoscope including an elongated insertion member, a light guide that is passed through the insertion member, an imaging device incorporated in a tip part that communicates with the insertion member, and a pair of angulation wires that is passed through the insertion member and coupled to the tip part in order to angle the tip part;

a lamp located at a position supplying illumination light over the light guide;

a camera control unit including a video signal processor that processes an image signal from the imaging device, and a first controller that controls the operation of the video signal processor;

an angulation wire control unit including a motor that drives the pair of angulation wires, and a second controller that controls the motor;

a system control unit having a first communication interface incorporated therein, and including a first system controller that outputs a control signal to the first controller or the second controller according to communication data received via the first communication interface, a third connector through which the first controller is connected, a fourth connector through which the second controller is connected, and a fifth connector through which serial communication data is transmitted/received to or from the first communication interface;

an expansion function unit having a second communication interface, which is identical to the first communication interface, incorporated therein, and including a second system controller that outputs a control signal to the first controller or the second controller according to communication data received via the second communication interface, an expansion function circuit that is controlled by the second system controller, a sixth connector through which the first controller is connected, a seventh connector through which the second controller is connected, and an eighth connector through which serial communication data is transmitted/received to or from the second communication interface; and a remote control unit being plugged in to the fifth connector or the eighth connector so that the remote control unit can be unplugged freely, and including a plurality of operation switches that is used to operate the camera control unit, the angulation wire unit, or the expansion function circuit, and a remote controller that outputs communication data via the first communication interface or the second communication interface according to an operation signal outputted responsively to a manipulation performed on any of the plurality of operation switches, wherein the system control unit and the expansion function unit are selectively stowed in a main unit.

7. An electronic endoscope system according to claim 6, further comprising:

an integrated circuit that is incorporated in the tip part and requires positive or negative voltage to act as a regenerative repeater that regenerates driving pulses, which are outputted by the video signal processor in order to drive the imaging device, to restore the original waveform of the driving pulses; and a capacitor for AC-coupling the driving pulses regenerated by the integrated circuit, wherein bipolar voltage driving pulses are generated in order to drive the imaging element.

8. An electronic endoscope system according to claim 6, wherein transmitting/receiving data between the system control unit or the expansion function unit, and the camera control unit, the angulation wire control unit, or the remote control unit is achieved according to a predetermined protocol.

9. An electronic endoscope system according to claim 6, wherein the expansion function unit selectively records at least received data on an external recording medium.

10. An electronic endoscope system according to claim 6, wherein a control program that describes a sequence of instructions to be followed by the system controller in the system control unit, or a control program that describes a sequence of instructions to be followed by an expansion function controller in the expansion function unit can be rewritten.

11. An electronic endoscope system comprising:

an endoscope including an elongated insertion member, a light guide that is passed through the insertion member, an imaging device incorporated in a tip part that communicates with the insertion member, and a pair of angulation wires that is passed through the insertion member and coupled to the tip part in order to angle the tip part;

a lamp located at a position supplying illumination light over the light guide;

a camera control unit including a video signal processor that processed an image signal sent from the imaging device, and a digital signal processor (DSP) control central processing unit (CPU) that controls the operation of the video signal processor;

an angulation wire control unit including a motor that drives the pair of angulation wires and an angle control CPU that controls the motor;

a remote control unit including a plurality of operation switches that is used to operate the camera control unit and the angulation wire control unit, and a remote control CPU that outputs communication data responsively to a manipulation performed on any of the plurality of operation switches; and a system control unit including a connector through which the remote control unit is connected, and a system control CPU that transmits communication data to the DSP control CPU or to the angle control CPU according to communication data received from the remote control unit through the connector.

12. An electronic endoscope system according to claim 11, further comprising:

an integrated circuit that is incorporated in the tip part, and requires positive or negative voltage to act as a regenerative repeater that regenerates driving pulses, which are outputted by the video signal processor in order to drive the imaging device, to restore the original waveform of the driving pulses; and a capacitor for AC-coupling the driving pulses regenerated by the integrated circuit, wherein bipolar voltage driving pulses are generated in order to drive the imaging element.

13. An electronic endoscope system according to claim 11, wherein transmitting/receiving data between the system control unit, and the camera control unit, the angulation wire control unit, or the remote control unit is achieved according to a predetermined protocol.

14. An electronic endoscope system according to claim 11, wherein a control program that describes a sequence of instructions to be followed by the system controller in the system control unit can be rewritten.

* * * * *